April 29, 1941. H. HONNEF ET AL 2,240,262
POWER GENERATING SYSTEM
Filed Sept. 24, 1937
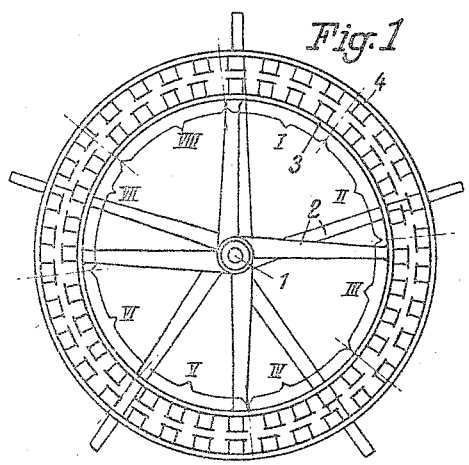
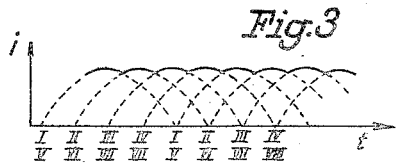
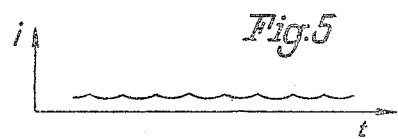
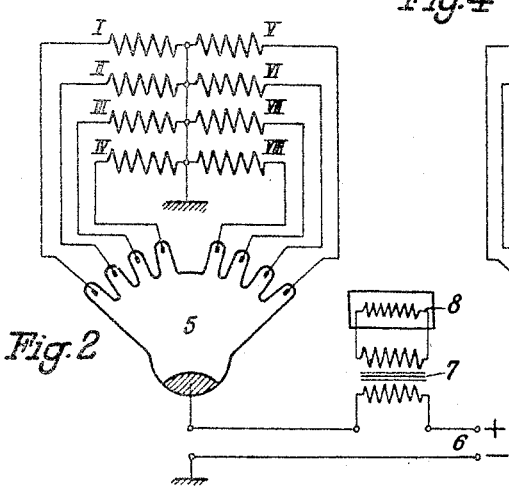
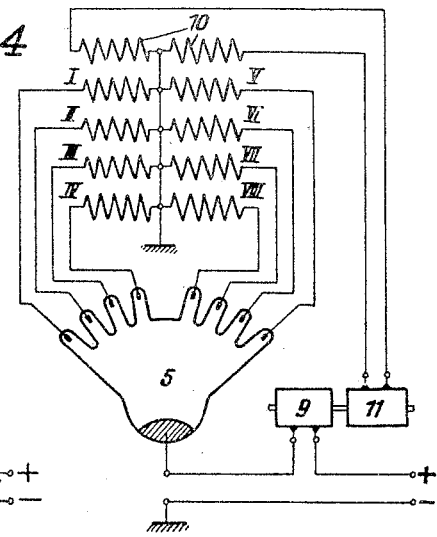
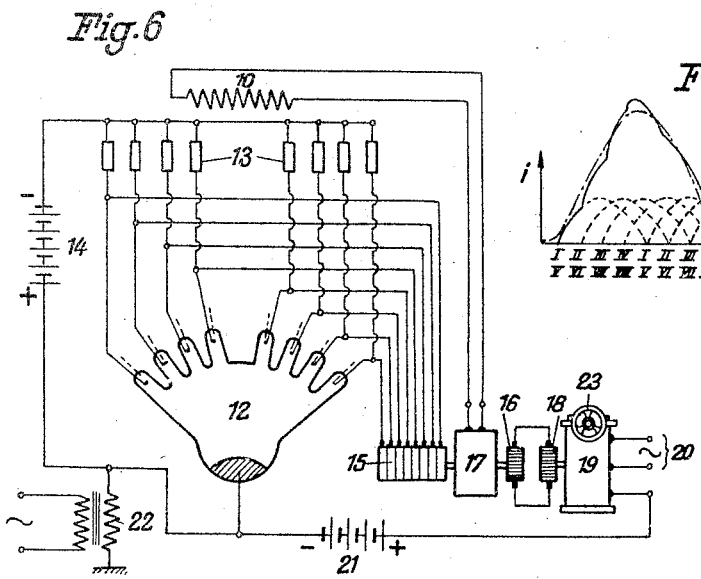
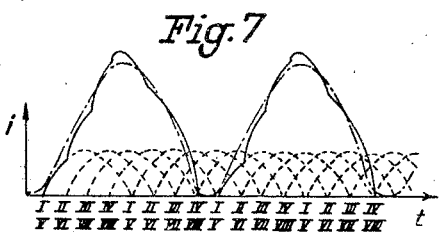
Inventors:
Hermann Honnef
Heinrich Geffcken
By: Richardson and Auer
Attys.

Patented Apr. 29, 1941

2,240,262

UNITED STATES PATENT OFFICE 2,240,262

POWER GENERATING SYSTEM

Hermann Honnef, Berlin, and Heinrich Geffcken, Berlin-Charlottenburg, Germany

Application September 24, 1937, Serial No. 165,498
In Germany September 21, 1936

6 Claims. (Cl. 172—237)

The present invention relates in general to power generating systems, and more in particular to systems of this character which are operated by wind power.

In constructing wind-operated electrical power units of great capacity, it is necessary to provide very large wind-wheels in order to obtain satisfactory results. Large wind-wheels having a diameter of 50 to 150 meters, for example, must rotate relatively slowly in order to avoid prohibitive peripheral speeds, and therefore permit economical current production only if the wind-wheels are utilized as carriers of the pole-rings of the generating devices, giving these pole-rings a very large diameter of about 40 to 80 meters.

In accordance with these known facts, it has been proposed to construct the current generator as a three-phase alternating current generator and to attach the stator pole-ring and the rotor pole-ring of such a generator on two oppositely rotating coaxially arranged wind-wheels. However, it is also known that the rotating speed of every wind-power machine depends on the wind velocity and that it is thus subject to considerable variations, which produce corresponding variations in the frequency of the generated alternating current. Such current with varying frequency is not suited for commercial consumption, and it has therefore been proposed to rectify it first and to supply it to the network either directly as a direct current, or after converting it into alternating current of constant frequency.

The invention is concerned with such a system, wherein the generator is structurally connected with the wind-wheels, together with auxiliary apparatus for simply and economically converting the initial energy into a current which is suitable for supply to the network. The invention proceeds from the recognition of the fact that the very great diameter of the pole-rings requires a subdivision into an unusually great number of individual poles, and that this subdivision opens completely novel possibilities in the field of electric power generation.

According to the invention, a rotor pole-ring is disposed opposite the uniformly subdivided stator pole-ring of the wind-power machine, the individual poles of which are subdivided into at least eight, and preferably more, e. g., twenty to thirty, electrically separated pole groups, the latter being connected to a discharge apparatus with a common load circuit and being excited under phase angles which increase from pole group to pole group by a fraction of $2\pi$ corresponding to the total number of pole groups. Alternating currents of similar frequency are thus created in the separate circuits of the individual pole groups, which are shifted in phase one against the other by equal fractions of 360°, and produce in the output circuit of the discharge device a considerably smoothed direct current. These currents may also be converted in the discharge device into an alternating current of substantially constant frequency, as will be presently explained more in detail.

Structural considerations make it desirable in very large wind-wheels to excite the individual pole groups under a step-like increasing phase angle which corresponds from pole group to pole group to a fraction of $4\pi$ in accordance with the total number of pole groups. The radially oppositely disposed pole groups are thereby subjected at any time to the same magnetic pull, so that the effect thereof upon the axle pressure is counteracted.

Assuming, for example, a large wind-power machine with a rotor pole-ring 250 meters in circumference, carrying 500 individual poles, these poles may be subdivided into 20 groups each having 25 poles which are shifted against one another in the exciting phase by $$\frac{4\pi}{20}=\frac{\pi}{5}$$

Two diametrically opposed groups are thus excited in the same phase and may be connected in series with the common voltage center point grounded. The result is a star circuit, the twenty free ends of which may be connected with the twenty anodes of a large mercury vapor rectifier. A direct current can be obtained between the cathode of this rectifier and ground, which has only about 5% wave form. This residual component of the primary alternating current can be easily filtered out and is preferably used for supplying the local needs of the power station, e. g., for heating, charging reserve batteries, and the like. The residual component of the primary alternating current may also be compensated by means of suitable equalizing devices, and the latter may be driven directly by the wind-power machine through a synchronous motor.

Instead of conducting the rectified current directly into the supply network, it may of course be converted in any suitable manner into an alternating current of constant frequency by means of a rotary converter or by means of known discharge apparatus with control grid.

In accordance with the invention, the discharge apparatus which is directly connected with the wind-power machine is used for this purpose, because it was found that the polyphase current delivered by the wind generator, even with a considerably fluctuating frequency, can be converted into an alternating current of constant frequency.

The invention will now be described in detail with reference to the accompanying drawing, wherein Fig. 1 shows in schematic representation a pair of wind-driven wheels and their pole-rings;

Fig. 2 indicates diagrammatically the circuit and the discharge device for the embodiment shown in Fig. 1;

Fig. 3 represents the current curve of the rectifier output according to Figs. 1 and 2;

Fig. 4 illustrates the system of Fig. 2 modified by the addition of a compensating generator for neutralizing the residual alternating current component;

Fig. 5 shows the wave form of the output of the compensating generator;

Fig. 6 shows a system for producing alternating current of constant frequency wherein the conversion is obtained by the use of a single discharge device; and Fig. 7 is the current curve diagram for the embodiment shown in Fig. 6.

Like reference numerals denote like apparatus throughout the drawing.

Referring now to Fig. 1, a wind-wheel is shown having the blades 2 and a shaft or axle 1, and a wheel rim 3 which carries the poles. Only 32 poles are shown on a somewhat enlarged scale for the sake of simplicity and clearness. These 32 poles are subdivided for the same reasons into only eight groups (I–VIII) which are in each instance shifted against each other by $$\frac{4\pi}{8} = \frac{\pi}{2}$$

of the produced alternating current, i. e., each by a quarter pole distance. A stator pole ring 4 is disposed opposite this rotor pole ring, having 34 poles which are uniformly distributed over the entire circumference. Alternating currents differing in phase are therefore produced in the windings of the pole groups I–VIII; but diametrically oppositely located pole groups (I and V, II and VI, III and VII, IV and VIII) are excited in phase with each other. The magnetic pull affecting these groups is therefore equalized as to its effect upon the shaft 1. The windings of the individual poles of a pole group are preferably connected in series. One end of this series circuit is in each instance grounded at the rim 3 and the other end is connected by way of a suitable slip-ring arrangement with one of the anodes of the discharge apparatus.

The electrical circuit of the discharge apparatus is shown diagrammatically in Fig. 2. The current-producing windings are designated by numerals I–VIII in accordance with the labeling of the pole groups shown in Fig. 1. Pole groups which are excited in phase are connected in series, with the voltage center points grounded, and the free ends are connected with the eight anodes of the rectifier 5. The rectified voltage is withdrawn by means of the bus bars 6 connected between the cathode of the rectifier 5 and ground. A transformer 7 is connected to the bus bar leading to the cathode which removes from the direct current the residual component of the primary alternating current and converts this residual component into heat by means of the resistance 8, to be used for operating auxiliary apparatus, for heating purposes, for hot air blowers, and the like.

Fig. 3 illustrates the current diagram of the rectifier 5. An examination of this diagram will show that even the slight subdivision of the generator into only eight phase shifted pole groups, chosen for the purpose of keeping the description and the drawing simple, furnishes a direct current of relatively slight wave form. As mentioned before, in a practical installation there are provided, instead of the eight pole groups, about twenty to fifty pole groups, and the result will be a direct current which is smoother than the one indicated in Fig. 3.

Instead of withdrawing from the network the residual component of the primary alternating current, as illustrated in Fig. 2, it may be filtered out by means of known chains of choke coils, or it may be compensated or neutralized by means of a compensating generator which is synchronously driven with the wind generator, as illustrated in Fig. 4. An alternating current machine 9 is for this purpose connected in series with the rectifier 5. This machine is driven by a synchronous motor 11, and the latter is supplied with current from the wind-power machine over the auxiliary windings 10. The wave form of the output of generator 9 is apparent from Fig. 5. This curve, superimposed upon the one shown in Fig. 3, will result in a direct current which is to all practical purposes completely equalized.

Fig. 6 shows an arrangement for generating alternating current of constant frequency using the polyphase alternating current with fluctuating frequency as it is delivered by the wind-power machine. The conversion is in this case taken care of with a single discharge device. The anodes of the discharge apparatus 12 are each equipped with a control grid and are connected with the windings of the wind-power machine according to the arrangement shown in Figs. 2 and 4. The individual control grids are normally negative with respect to the mercury cathode, being connected by means of the resistances 13 with the battery 14. They are also connected, as shown in Fig. 6, with the bars of the commutator 16 over a rotary contact or slip-ring system 15. The commutator 16 is driven by the synchronous motor 17 in synchronism with the frequency delivered by the wind-power machine, receiving current from the auxiliary winding 10. The commutator 16 operates together with a second commutator 18 which is driven by the synchronous motor 19, and the latter receives current from the control frequency source 20. The brush sets of the two commutators 16 and 18 are connected together.

By the above described arrangement, the individual control grids of the discharge apparatus 12 are connected at different moments with the cathode, or with a suitably selected positive potential delivered by the battery 21. Depending upon the position of the two commutators relative to their corresponding brush sets, a discharge is thus caused at different moments to the individual anodes, according to the known superposed curve principle, and an alternating current curve of constant frequency is built up from the phase shifted current curves of the individual pole groups of the wind-power machine.

Fig. 7 illustrates the corresponding current curve diagram, wherein the current curves of the individual pole groups (I–VIII) of the generator are indicated in dash lines, the (somewhat enlarged) current curve of the control frequency in dot-dash lines, and the resulting superposed curve in full lines. It will be seen that even the simplified subdivision into only eight pole groups results in a relatively smooth alternating current curve which can be directly supplied to the network over a transformer 22 after filtering out undesired superposed waves.

The following considerations will show that the resulting frequency supplied by an arrangement of this kind to the transformer 22 is indeed independent of fluctuations of the frequency delivered by the wind-driven generator. In case the frequency of the wind-driven generator increases, the dash line curves in Fig. 7 will contract in the direction of the time axis $t$. The rotational speed of the collector 16 increases correspondingly at the same time, so that the same grid phases are on its stationary brushes which are required by the control collector 18 (rotating with constant frequency) for building up the superposed curve. The result is simply a curve which is better equalized, and it can be graphically demonstrated that even considerable changes in the frequency delivered to the discharge apparatus 12 can never affect the frequency of the superposed curve, but merely its contents in superposed waves, and that this content of superposed waves diminishes with the number of pole groups chosen for subdividing the rotor pole-ring of the wind-power machine in the manner indicated.

In order to simplify the parallel connection of the wind-power station with other networks, it is advisable to equip at least one of the rotary control members (16, 18) with known means for adjustably shifting its phase against the phase of the drive frequency. A hand wheel 23 may be provided for this purpose, which acts upon a worm gear for effecting a rotation of the synchronous motor 19 around its axis. It will be clear that such a rotary displacement must result in an advance or retardation of the superposed curve frequency, and its phase can therefore easily be adjusted to the phase of the parallel network. The same result may be obtained by turning the brush set around the axis of the two collectors 16, 18.

Changes may be made within the scope and spirit of the appended claims, wherein is defined what is considered new and desired to have protected by Letters Patent of the United States.

What we claim is:

1. In a wind-driven generating system, a wind generator including armature circuits for generating a plurality of alternating currents in displaced overlapping phase relation, a rectifier having a cathode and a plurality of anodes in which said circuits are terminated, respectively, a transformer having its primary winding connected between said cathode and a terminal common to said armature circuits, each armature circuit extending from said common terminal to its associated anode, a plurality of grids in said rectifier, and means including a constant frequency source and commutating devices operated in synchronism with said source and said wind generator, respectively, for controlling the potentials on said grids to produce a constant frequency output in said secondary winding regardless of variations in the speed of the said wind generator.

2. Apparatus for producing a constant frequency alternating current from a polyphase generator armature operating at variable speed, said means including a space discharge device having anodes equal in number to and electrically associated with the different phases of said armature, a control grid for each anode, a direct current circuit including said discharge device, means driven at constant speed for intermittently closing one point in a circuit for placing a positive potential on said grids, means driven in synchronism with said generator armature for completing said last mentioned circuit to a plurality of said grids each time the circuit is closed by said constant speed means, thereby producing an intermittent current flow in said direct current circuit, and a transformer for converting said intermittent current to an alternating current.

3. Apparatus for controlling a space discharge device having a plurality of anodes and associated grids, said apparatus including a grid circuit comprising a common section and a plurality of branches, one for each grid, a constant speed device for intermittently closing said common section, and a variable speed device for closing a variable number of said branches each time the common section is closed, the number of branches closed each time depending on the speed of the variable speed device.

4. In combination, a space discharge device having a plurality of anodes and associated grids, means adapted to apply a positive potential to said grids successively and repeatedly, and a constant speed device for rendering said means alternately effective and ineffective at a rate such that the positive potential is applied to a plurality of grids successively each time said means is rendered effective.

5. Apparatus for producing a constant frequency alternating current from the armature of a wind generator operating at variable speed and having a plurality of windings in displaced phase relation, said apparatus comprising a space discharge device having anodes equal in number to said windings, conductors connecting said windings in series with the said discharge device, including a common conductor connecting said windings to the cathode and individual conductors connecting said windings to the said anodes, respectively, an output transformer having its primary winding in series with said common conductor, a control grid for each anode, a commutator driven at a speed bearing a predetermined relation to the generator speed and varying with it, connections between the segments of said commutator and said control grids, a brush bearing on said commutator, and means including a device driven at constant speed for periodically applying positive potentials to said brush.

6. Apparatus according to claim 5, wherein means is provided for shifting the phase of said positive potentials to bring the output of said transformer in phase with the current in another circuit.

HERMANN HONNEF.
HEINRICH GEFFCKEN.